United States Patent Office 3,077,563
Patented Feb. 12, 1963

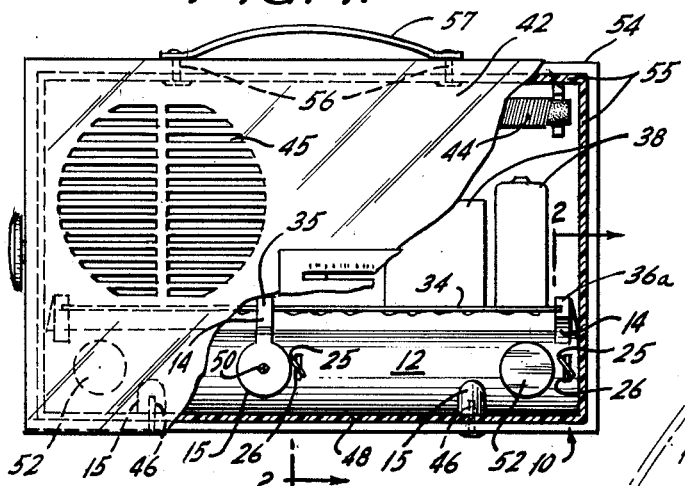
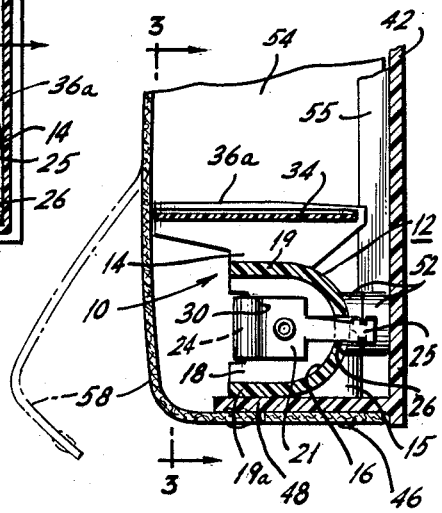
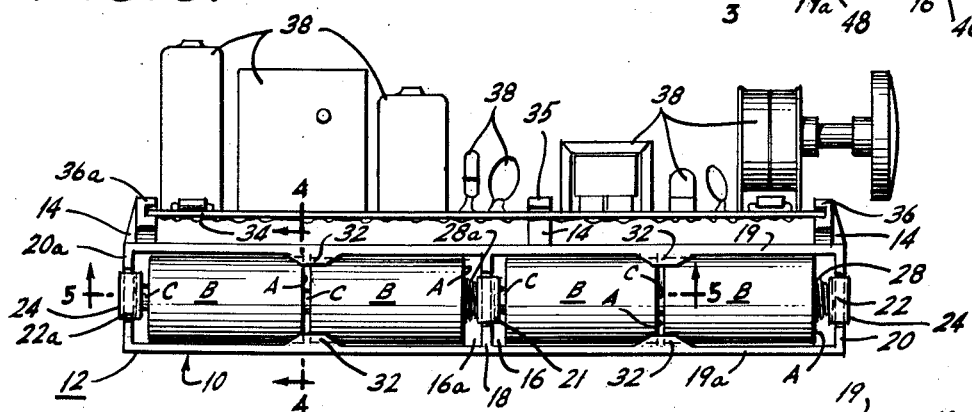
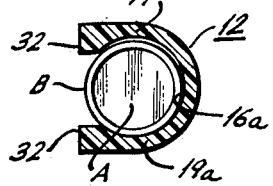
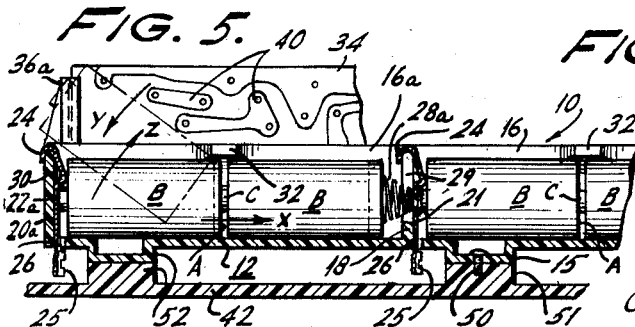
Feb. 12, 1963  C. W. COMBS ET AL  3,077,563
BATTERY-HOLDING AND CHASSIS-SUPPORTING UNIT
FOR BATTERY OPERATED RADIO RECEIVERS
Filed Jan. 15, 1960
INVENTORS
CHARLES W. COMBS
ROBERT C. SIMMONS
BY
ATTORNEY

3,077,563
BATTERY-HOLDING AND CHASSIS-SUPPORTING UNIT FOR BATTERY OPERATED RADIO RECEIVERS
Charles W. Combs, Cheltenham, and Robert C. Simmons, Levittown, Pa., assignors, by mesne assignments, to Philco Corporation, Philadelphia, Pa., a corporation of Delaware
Filed Jan. 15, 1960, Ser. No. 2,653
4 Claims. (Cl. 325—353)

The present invention relates to electrical apparatus and more particularly to self-contained battery-operated electrical apparatus.

While of broader applicability, the invention is especially advantageous in the construction of portable transistorized radio receivers. In receivers of this type, compactness and rigidity of construction are of prime importance, and it is an object of this invention to improve and simplify the association of cooperative elements of a portable battery-operated radio receiver so as to provide a compact unitary assembly having increased stability and ruggedness.

It is also an object of the invention to provide a novel battery-holding and chassis-supporting unit which facilitates and simplifies the association of batteries and circuitry operated thereby within a portable radio receiver housing of limited overall dimensions.

Another object of the invention is to provide a structural unit adapted to perform the several functions of holding batteries, supporting a circuit chassis, and mounting the batteries and the circuit chassis, as a unitary assembly, upon a housing structure provided therefor.

Other characteristic features of the invention reside in the provision of a novel unit which is adapted to serve as a structural part of a housing for mounting the batteries and the circuit chassis of a self-contained battery-operated radio receiver. The novel unit is such that the batteries and chassis can be assembled with other operative elements of the receiver to constitute a unitary structure capable of acting effectively as a fixture for easy inspection, testing and repair of the chassis under actual operating conditions.

In a preferred embodiment, the above noted and other objects and characteristic features of the invention are achieved by employing a main body adapted to define a receptacle for cylindrical batteries; said body having members to support a radio receiver chassis, and also having portions for attachment to a panel which carries other elements of the receiver. The receptacle is constructed for tandem seating of the batteries and has means for positively retaining these batteries without interfering with their placement into or removal from operative position. The support members are constructed for slidably receiving marginal portions of the circuit chassis to support the same adjacent to the batteries but in position where either the batteries or the chassis can be manipulated separately. The attaching portions are constructed to provide for rigid coupling between the mentioned body and panel so as to constitute a unitary structure capable of being readily associated with a simple shell to define the receiver housing.

The nature of the invention, its objectives and advantages will be more fully understood from the following detailed description based on the accompanying drawing which illustrates the preferred embodiment, and in which:

FIGURE 1 is an elevational sectional view of a portable battery-operated radio receiver constructed in accordance with the principles of the invention;

FIGURE 2 is an enlarged cross-sectional view taken substantially on line 2—2 of FIGURE 1;

FIGURE 3 is an elevational view of the battery-holding and chassis-supporting unit as seen in the general direction of arrows 3—3 of FIGURE 2;

FIGURE 4 is an enlarged cross-sectional fragmentary view looking in the direction indicated by arrows 4—4 in FIGURE 3; and FIGURE 5 is a cross-sectional fragmentary view looking in the direction indicated by the arrows 5—5 in FIGURE 3, but with the battery-holding and chassis-supporting unit shown rigidly coupled to the aforesaid panel.

Having more particular reference to the drawing, the illustrated radio receiver comprises a non-conductive semi-cylindrical structural unit 10 which includes a trough-like battery-holding receptacle 12, chassis-supporting members 14, and attaching portions or bosses 15. The unit 10 can be and preferably is molded of plastic material, and the members 14 and the portions 15 can be and preferably are integral with the receptacle 12.

As indicated above, the receptacle 12 has the form of an elongated trough and accommodates a series of axially aligned cylindrical dry batteries B of usual and well known construction, including an exposed anode end surface A and a protruding cathode end cap C. In the illustrated embodiment, and as more clearly appears from FIGURES 3 and 5, the trough or receptacle 12 is divided into two longitudinally disposed compartments 16 and 16a. The receptacle is divided by means of an intermediate wall 18 which is disposed between the side walls 19 and 19a, substantially midway between end walls 20 and 20a, one end wall 20 defining the outer extremity of the compartment 16 and the other end wall 20a defining the outer extremity of the other compartment 16a. Each of these compartments accommodates a pair of batteries disposed end-to-end with the cathode end cap of one battery abutting the anode end surface of the other battery.

Electrically conductive coupling of the series of batteries is established by a set of three contact plates, one plate 21 being associated with the intermediate wall 18, another plate 22 being associated with the end wall 20, and a third plate 22a being associated with the other end wall 20a. Each contact plate is provided with a hook 24 and a notched extension 25, said hook engaging the associated wall to hang the plate therefrom, and said notched extension passing through a slot 26 in the floor of the trough or receptacle 12 and being twisted to lock the plate in operative position.

As clearly seen in FIGURE 3, the two batteries contained within each compartment are slidable longitudinally therein and are yieldably urged into electrically conductive engagement with each other and with the contact plates associated therewith. For that purpose a contact spring 28 is conductively connected to the end contact plate 22 and extends therefrom into the compartment 16 so as to bear resiliently upon the anode end surface of the battery which lies adjacent said plate 22, and a second contact spring 28a, is conductively connected to the intermediate contact plate 21 and passes through an opening 29 in the intermediate wall 18 to project into the compartment 16a so as to bear resiliently upon the anode end surface of the battery which lies adjacent said intermediate wall. Thus, the aforesaid contact springs function to effect abutting engagement between the associated batteries in the respective compartments, as well as abutting engagement between the intermediate contact plate 21 and the adjoining battery cathode cap and between the end contact plate 22a and the adjoining battery cathode cap.

Accidental disengagement of the cathode caps from the contact plates 21 and 22a is prevented by means of offsets 30 (FIGURE 5) provided on said plates to form keepers overlapping said caps when the batteries are in properly seated position. Moreover positive retention of the batteries in seated position within their compartments, without any possibility of the batteries bowing or arching out of line, is assured by means of tabs 32 (FIGURES 3, 4 and 5) which extend inwardly from the receptacle side walls 19 and 19a to overlap peripheral surface portions of adjoining batteries at their abutting ends. The batteries can readily be manipulated to slide within the receptacle 12 and to be lowered into or lifted out of said receptacle as represented by arrows X, Y and Z. Thus it will be understood that the batteries are adapted for easy insertion into and removal from the associated compartments 16 and 16a of said receptacle 12.

As previously mentioned, the receptacle 12 also serves to support the radio receiver chassis and, to this end, is provided with the supporting members 14. In the illustrated embodiment and as best seen in FIGURE 3, these members 14 extend laterally from and perpendicularly to the side 19 of the receptacle 12 and are adapted to support a transistorized portable radio chassis including a generally rectangular printed circuit board 34 of conventional construction. For that purpose, one of the members 14 is located adjacent the intermediate wall 18 of the receptacle and has a slotted finger 35 for engagement with an intermediate portion of said board along a longitudinal edge thereof, another of said members is located adjacent the end wall 20 of said receptacle and has a channeled arm 36 into which one end portion of the circuit board is slidably received, and still another of said members is located adjacent the other end wall 20a of said receptacle and is provided with a channeled arm 36a for slidably receiving the other end portion of said board. As is customary, circuit components 38 are mounted on the upperside of the board 34 and are connected through a predetermined pattern of conductive paths 40 provided on the underside of said board. The circuit components and the batteries are electrically coupled by means of conductors (not shown) leading from the extensions 25 of the contact plates 21, 22 and 22a to appropriate portions of the conductive paths 40. It will be apparent from FIGURE 3, that the assembly of support unit 10, batteries B and board 34 of the chassis structure is integral and separately handleable for repair and testing procedures.

As shown in the drawing, the battery-holding and chassis-supporting assembly is mounted on a panel 42 which carries an antenna 44 and a speaker 45. Mounting of the aforesaid assembly is accomplished by means of suitable securing elements 46 passing through a shelf 48 extending at right angles from the panel 42, said securing elements 46 being in screw-threaded engagement with two of the attaching portions 15, these latter portions being bored internally and resting upon said shelf 48. Another securing element 50 passes through another attaching portion 15 which is countersunk and projects from the floor of the receptacle 12, said element 50 being in screw-threaded engagement with a boss 51 (FIGURE 5) arranged on the inside surface of the panel 42. Pairs of abutments 52 provided on confronting portions of the receptacle 12 and panel 42 cooperate to stabilize said receptacle in its mounting on the said panel.

A shell 54 (FIGURES 1 and 2) is associated with the panel 42 to constitute the housing of the radio receiver. For that purpose, said panel is provided with rearwardly extending flanges 55 adapted for snugly fitted engagement with marginal portions of said shell 54. This shell is affixed to the panel by means of the previously mentioned securing elements 46 and also by means of additional securing elements 56 (FIGURE 1) which are employed to connect a handle 57 to the housing. As illustrated in FIGURE 2, a portion of the shell which confronts the open side of the battery-holding receptacle 12, is provided with a closure flap 58 for giving access to the batteries so as to provide for insertion and removal thereof in the manner described above.

Although a preferred embodiment has been shown and described, it will be recognized that the invention is not limited to the specific structure of this embodiment, but embraces such changes and variations as come within the scope of the subjoined claims.

We claim:

1. For battery-operated radio receivers, a unit for holding a series of batteries and for supporting a component-carrying chassis, said unit comprising longitudinal and transverse walls defining an elongated receptacle with a longitudinal open side for passage of batteries into and out of end-to-end contact alignment within said receptacle, said transverse walls being so disposed with respect to each other and to said longitudinal walls as to define a battery seating space longer than the combined length of the batteries in the series which is to occupy said space, a resilient contact element carried by one of said transverse walls to engage one end of the series of batteries and to urge the same toward another one of said transverse walls, a fixed contact element carried by said other one of said transverse walls to engage the other end of the series of batteries, tabs projecting inwardly of said receptacle from said longitudinal walls and overlapping said open side to overlie adjacent contact end portions of adjoining batteries when occupying said space and urged by said resilient contact into engagement with said fixed contact, and chassis-engaging members extending outwardly of said receptacle from one of said longitudinal walls.

2. For battery-operated radio receivers, a battery-holding and chassis-supporting unit comprising a receptacle adapted for end-to-end seating of a series of batteries, said receptacle including side walls having longitudinal edges outlining an opening for passage of batteries therethrough, battery-retaining tabs provided on said edges and overlapping said opening to overlie restricted areas at adjacent end portions of adjoining bateries when seated in said receptacle, and chassis-engaging means arranged on one of said side walls and extending outwardly therefrom, said means including parallel spaced members each having a recessed portion for receiving and supporting the chassis.

3. For battery-operated radio receivers, a battery-holding and chassis-supporting unit comprising a receptacle adapted for end-to-end seating of a series of batteries, said receptacle including side walls having longitudinal edges outlining an opening for passage of batteries therethrough, battery-retaining tabs provided on said edges and overlapping said opening to overlie restricted areas at adjacent end portions of adjoining batteries when seated in said receptacle, chassis-engaging means arranged on and extending outwardly from one of said side walls, said means being in the form of spaced channelled members for slidably receiving and supporting the chassis therebetween, and mounting means on said receptacle to mount said unit in a receiver cabinet, said mounting means being in the form of fastener-receiving bosses connectable to wall portions of the receiver cabinet.

4. For battery-operated radio receivers, a battery-holding and chassis-supporting unit comprising an elongated receptacle divided into adjoining separate compartments, each adapted for end-to-end seating of a pair of cylindrical batteries, and each including oppositely facing side walls having longitudinal edges outlining an opening for passage of batteries therethrough, means for preventing arching of said batteries in said compartments, said means including tabs provided on said edges and extending from said facing side walls and overlapping said opening of each of said compartments to overlie restricted areas at the abutting ends of a pair of batteries when seated in said compartment, and chassis-engaging means arranged on said receptacle and extending laterally therefrom, said last named means consisting of a pair of confronting members and a finger, each of said members and said finger having a recessed portion for receiving and supporting the chassis, one of said members being disposed at one end portion of said elongated receptacle, the other of said members being disposed at the other end portion of said receptacle, and said finger being disposed at an intermediate portion of said receptacle.

References Cited in the file of this patent

UNITED STATES PATENTS

| | | |
|---|---|---|
| 2,673,925 | Braun | Mar. 30, 1954 |
| 2,910,580 | McCleary | Oct. 27, 1959 |